(12) United States Patent
Ishizaka

(10) Patent No.: US 11,780,320 B2
(45) Date of Patent: Oct. 10, 2023

(54) LOUVER STRUCTURE

(71) Applicant: HONDA MOTOR CO., LTD., Tokyo (JP)

(72) Inventor: Keita Ishizaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/532,504

(22) Filed: Nov. 22, 2021

(65) Prior Publication Data

US 2022/0161650 A1 May 26, 2022

(30) Foreign Application Priority Data

Nov. 25, 2020 (JP) ................. 2020-195526

(51) Int. Cl.
*B60K 11/08* (2006.01)
*B60L 58/26* (2019.01)
*B60K 11/06* (2006.01)

(52) U.S. Cl.
CPC .............. *B60K 11/08* (2013.01); *B60K 11/06* (2013.01); *B60L 58/26* (2019.02)

(58) Field of Classification Search
CPC ....... B60K 11/08; B60K 11/085; B60K 11/06; B60L 58/26
See application file for complete search history.

(56) References Cited

U.S. PATENT DOCUMENTS

2008/0297136 A1* 12/2008 Gaboury ............. H01M 10/625
454/69
2010/0071980 A1 3/2010 Kokaji et al.
2016/0243919 A1 8/2016 Yamanaka et al.
2018/0056894 A1 3/2018 Tsumura et al.
2018/0065458 A1 3/2018 Ogawa et al.
2020/0122568 A1 4/2020 Kano
2020/0148027 A1 5/2020 Aoki et al.

FOREIGN PATENT DOCUMENTS

| CN | 107791813 A | 3/2018 |
|---|---|---|
| CN | 110831801 A | 2/2020 |
| GB | 1032339 A | 6/1966 |
| JP | 2004-158202 A | 6/2004 |
| JP | 2006-082803 A | 3/2006 |
| JP | 2008-114706 A | 5/2008 |
| JP | 2016-153279 A | 8/2016 |
| JP | 2018-034751 A | 3/2018 |
| JP | 2018-203141 A | 12/2018 |
| JP | 2019-121573 A | 7/2019 |
| WO | 2019/008871 A1 | 1/2019 |

OTHER PUBLICATIONS

Office Action received in corresponding CN application No. 202111362464.3 dated Feb. 22, 2023 (6 pages).
Office Action received in corresponding Japanese application No. 2020-195526 dated Jun. 27, 2023 with English translation(7 pages).

* cited by examiner

*Primary Examiner* — Jacob M Amick
(74) *Attorney, Agent, or Firm* — Rankin, Hill & Clark LLP

(57) ABSTRACT

A louver structure is provided that reduces noise propagated to a compartment of a vehicle. The louver structure includes: a cooling fan configured to cool a battery; a back wall configured to separate the cooling fan from a compartment and having an air inlet to communicate with the cooling fan; and a louver member attached to the back wall and covering the air inlet. The louver member is provided with a labyrinth structure.

3 Claims, 7 Drawing Sheets

LOUVER STRUCTURE

CROSS-REFERENCE TO RELATED APPLICATION

This application claims the benefit of priority to Japanese Patent Application No. 2020-195526 filed on Nov. 25, 2020, the disclosures of all of which are hereby incorporated by reference in their entireties.

TECHNICAL FIELD

The present invention relates to a louver structure.

BACKGROUND OF THE INVENTION

A louver structure has been known for usage in a high-voltage electrical component cooling device which cools an inverter and a battery to supply power via the inverter to a driving motor of an automobile, with air inside a compartment. Such a louver structure includes an air intake grill having air inlets exposed to the compartment to introduce air (see Japanese Patent Application Publication No. 2006-082803 A, for example).

SUMMARY OF THE INVENTION

Problems to be Solved

Such a conventional louver structure causes fan noise by cooling air to cool the battery to be propagated from the air intake grill to the compartment, to leave room for improvement. The present invention is intended to provide a louver structure to reduce noise propagated to the compartment.

Solution to Problem

A louver structure according to the present invention includes: a cooling fan configured to cool a cooled object; a back wall configured to separate the cooling fan from a compartment of a vehicle and having an air inlet to communicate with the cooling fan for the cooled object; and a louver member attached to the back wall and covering the air inlet. The louver member is provided with a labyrinth structure.

Advantageous Effects of the Invention

The louver structure of the present invention provides a louver structure to reduce noise propagated to the compartment.

EMBODIMENTS OF THE INVENTION

Hereinafter, a description is given of an embodiment of the present invention, with reference to the drawings as required. The same reference signs are assigned for the same components, with duplicate descriptions thereof omitted. The directions are essentially described, based on a front-rear direction, a right-left direction, and an up-down direction as viewed from a driver, unless otherwise specified. A vehicle width direction is the same as the right-left direction.

Figure 1:
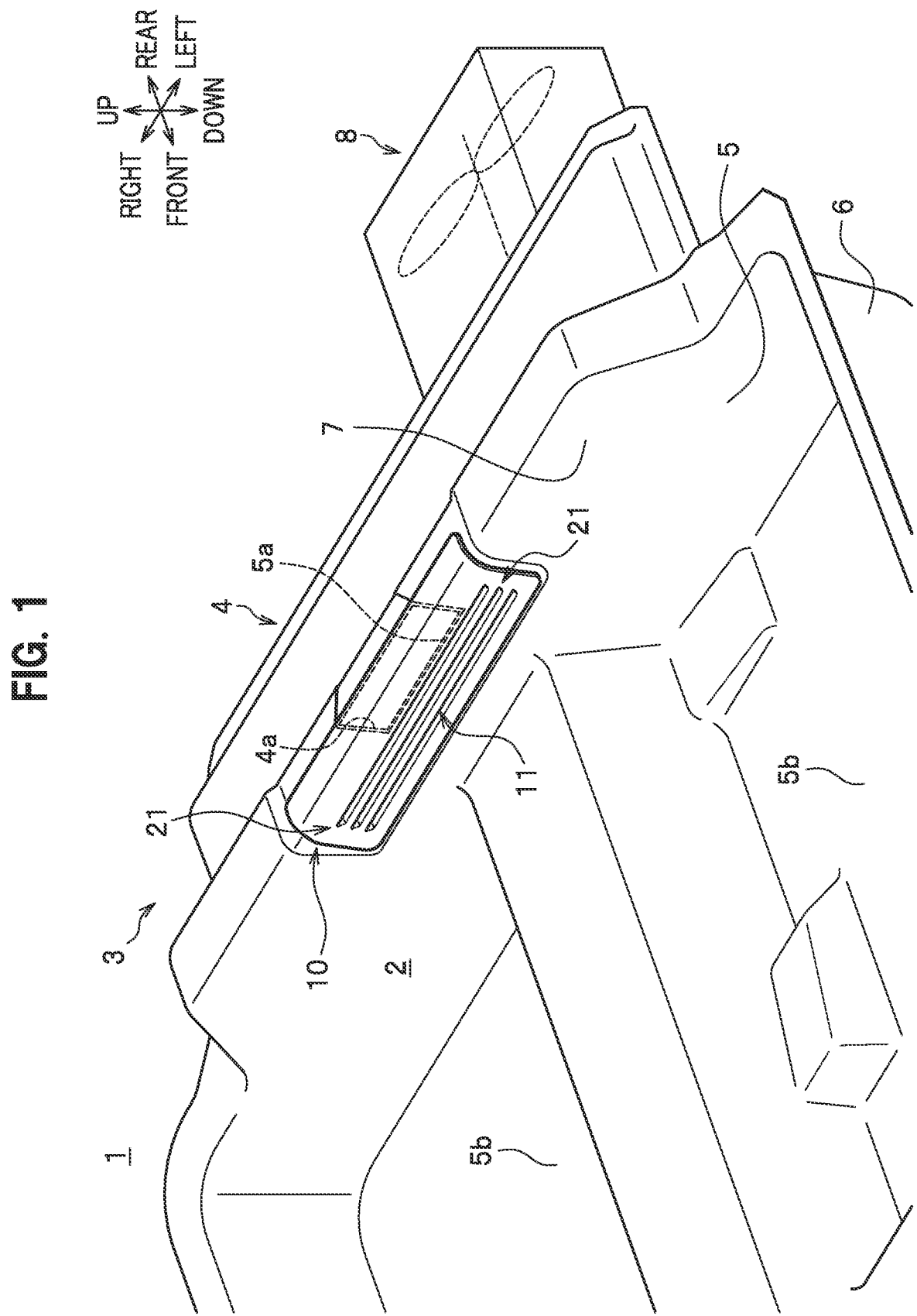
FIG. 1 is a perspective view of a louver structure according to an embodiment of the present invention, arranged with a battery provided at a rear of a vehicle and a floor carpet provided on a floor panel.

A louver structure of the present embodiment has a battery 4 arranged in a rear space 3 behind a compartment 2 of a vehicle 1, as shown in FIG. 1. The battery 4 includes a battery body as a cooled object, a battery case covering around the battery body, and a cooling fan 8 to cool the battery body. The cooling fan 8 is schematically shown for the purpose of illustration. The battery case is formed with an air inlet 4a exposed to the compartment 2 and communicating with the cooling fan 8. The air inlet 4a is used to introduce air for cooling from inside the compartment 2 and blow the air to and around the battery body, by driving the cooling fan 8.

A floor carpet 5 is laid in the compartment 2 over a floor panel at a bottom of the vehicle 1. The floor carpet 5 has a right and left sides of a center tunnel, protruding near the center in the vehicle width direction, recessed to form bottom portions 5b, which are each substantially flat. A peripheral wall 6 extends upward from an outer edge of the bottom portion 5b, to form a dish shape having a vertical cross section in a concave shape. A back wall 7 is arranged at a rear of the peripheral wall 6. The back wall 7 has a predetermined height from an upper face of the floor panel. This causes the back wall 7 to separate an area for the cooling fan 8 from the compartment 2. The back wall 7 is formed, at an upper edge thereof in the center in the vehicle width direction, with a recessed portion 5a notched in a substantially square shape. The recessed portion 5a is formed in a recess provided in a region inclusive of the air inlet 4a so as to have a larger width than the air inlet 4a. A louver member 10, to be described below, is mounted in the recess.

In the present embodiment, the air inlet 4a is arranged in the recessed portion 5a so as to have a front end thereof facing a space in the compartment 2. This causes the space in the compartment 2 to communicate with an internal space of the battery 4 via the air inlet 4a. Then, the air inside the compartment 2 is taken into the battery case via the air inlet 4a, by driving the cooling fan 8, to cool the battery body.

Figure 2:
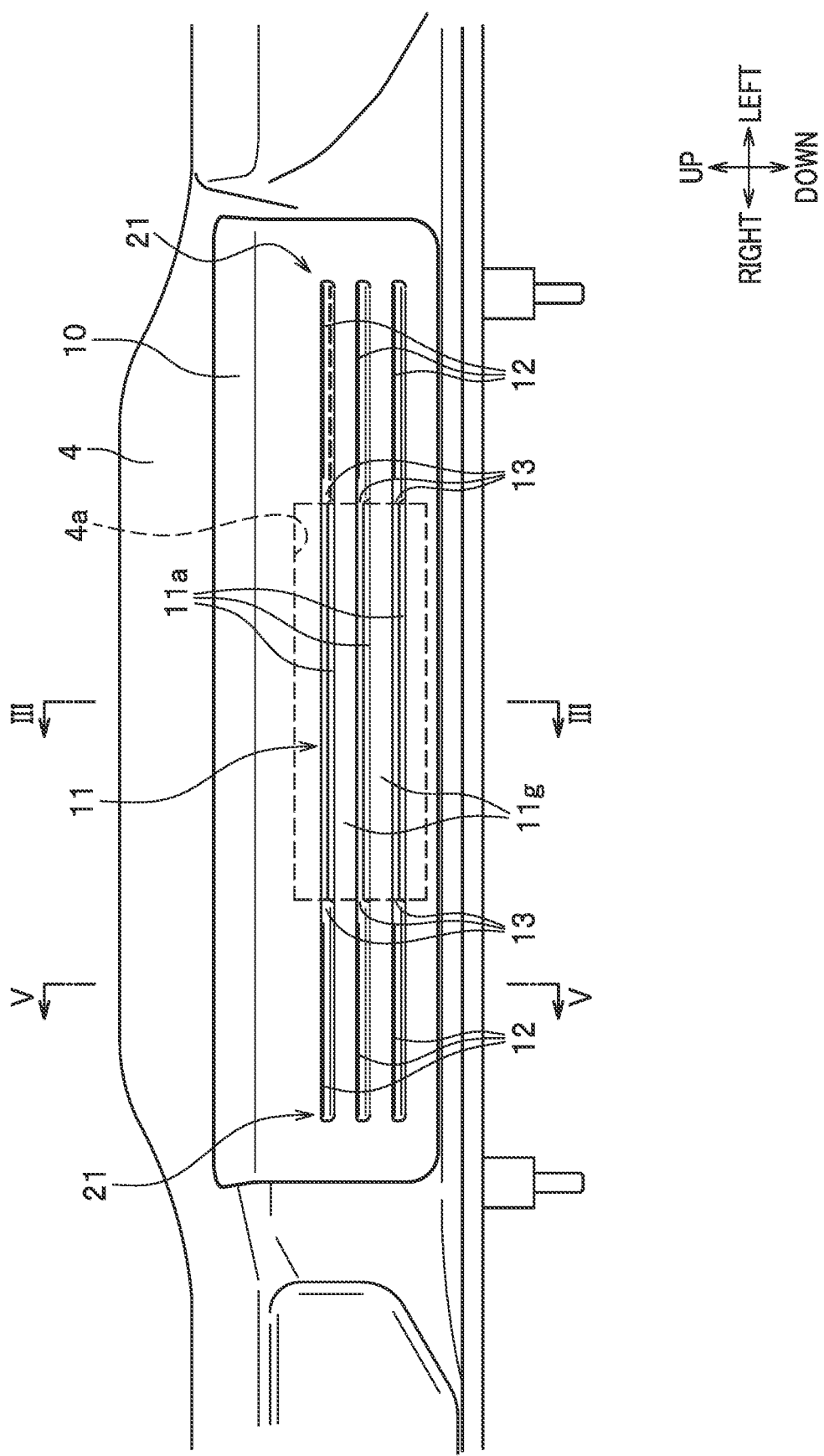
FIG. 2 is a front view of a portion of the louver structure according to the present embodiment, where a louver is mounted, as viewed from a front side of a vehicle.

The back wall 7 is provided, in the center in the vehicle width direction, with the louver member 10 mounted in the recessed portion 5a and covering the air inlet 4a. As shown in FIG. 2, the louver member 10 is provided with a labyrinth structure 11 having a U-shaped portion 11a in a labyrinth shape to reduce propagation of noise, while allowing air to pass through. When the louver member 10 is mounted in the recessed portion 5*a* to cover the air inlet 4*a*, a portion of the louver member 10 having the labyrinth structure 11 faces the air inlet 4*a*.

Figure 3:
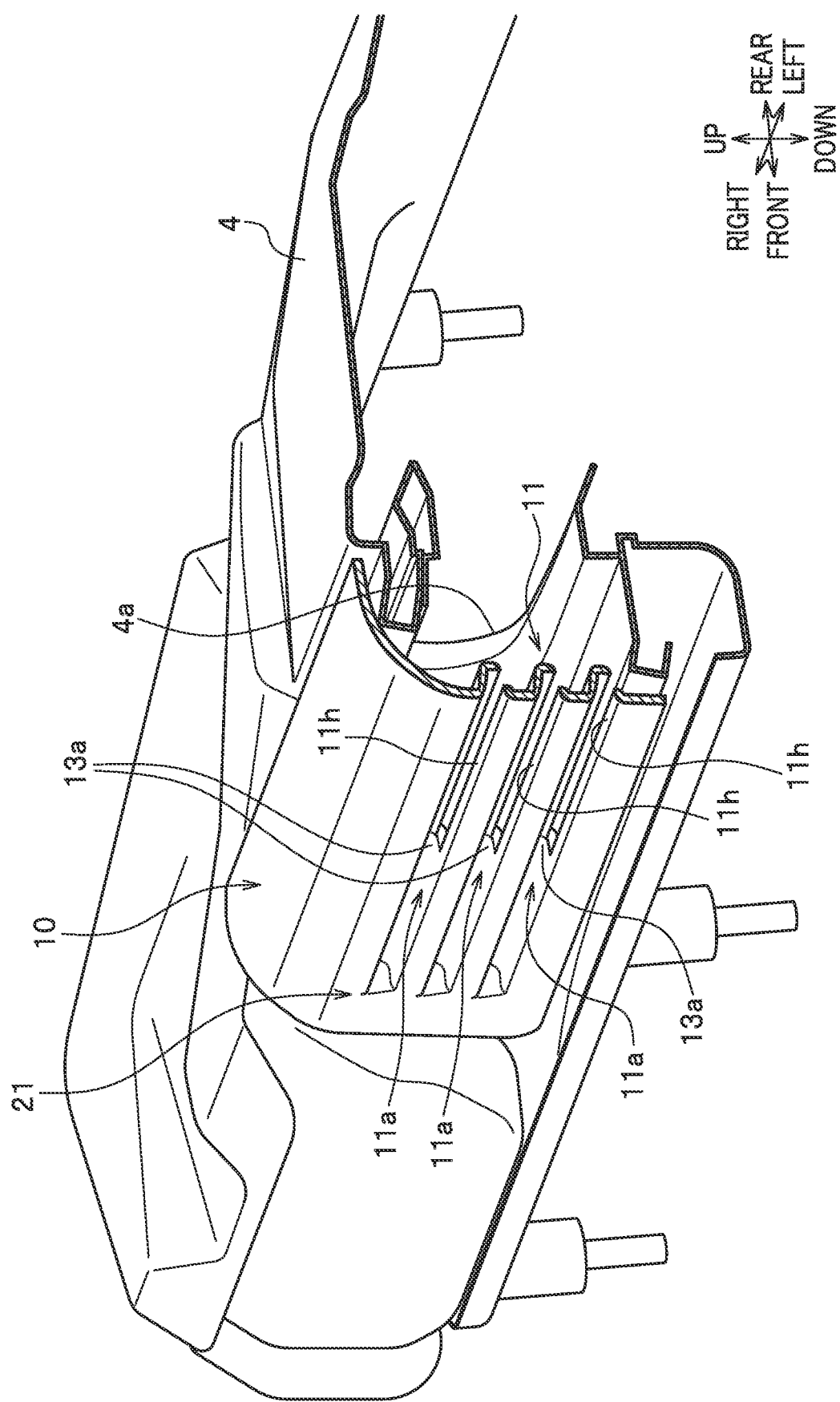
FIG. 3 is a partial cross-sectional perspective view of the louver structure according to the present embodiment, taken along a line III-III in FIG. 2.
Figure 4:
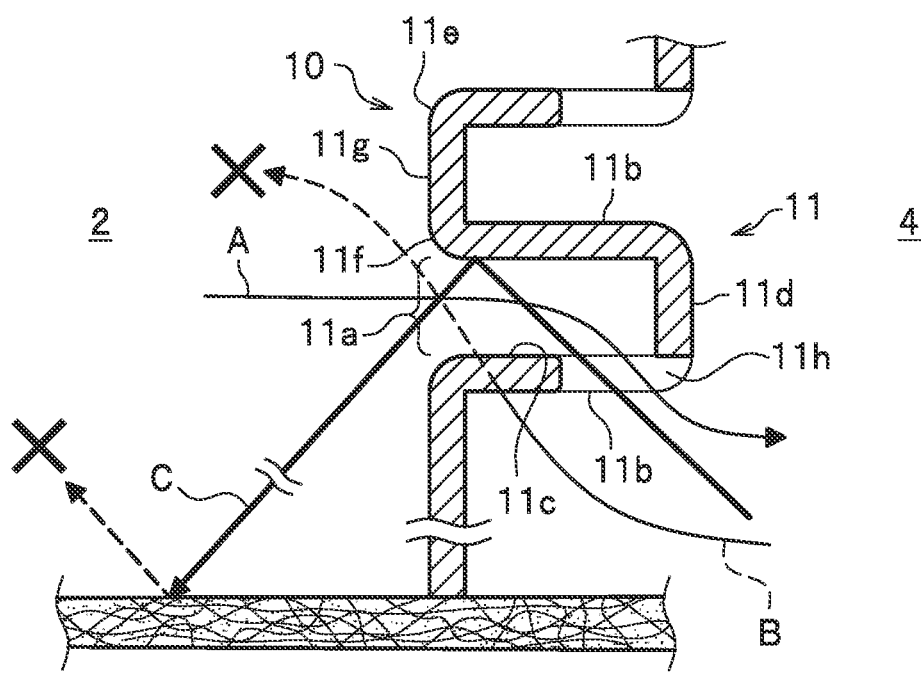
FIG. 4 is a vertical cross-sectional view of the louver structure according to the present embodiment, with the vicinity of a center in a vehicle width direction of a louver enlarged.

FIG. 3 is a partial cross-sectional perspective view of the labyrinth structure 11 formed in the louver member 10 of the present embodiment. The louver member 10 of the present embodiment has the two or more U-shaped portions 11*a* aligned in an up-down direction, each extending in the vehicle width direction, and the three U-shaped portions 11*a* are shown here. As shown in FIG. 4, the U-shaped portion 11*a* has an upper wall 11*b*, a lower wall 11*c*, and a vertical wall 11*d*, to have a substantially U-shape in cross section so as to open to the compartment 2. In addition, a connection wall 11*g* is provided between the adjacent U-shaped portions 11*a* in the up-down direction. The connection wall 11*g* connects an inside edge 11*e* of the lower wall 11*c* of the U-shaped portion 11*a* on the upper side with an inside edge 11*f* of the upper wall 11*b* of the U-shaped portion 11*a* on the lower side.

Further, the lower wall 11*c* is formed, in a portion thereof closer to the vertical wall 11*d*, with a communication portion 11*h* to communicate in the up-down direction (see FIG. 3). In other words, the lower wall 11*c* remains on an interior side of the communication portion 11*h*. In the present embodiment, the size of the communication portion 11*h* is about a half the size in a depth direction (front-rear direction) of the lower wall 11*c*. The labyrinth structure 11 is configured to have the upper wall 11*b*, the vertical wall 11*d*, the lower wall 11*c* formed with the communication portion 11*h*, the connection wall 11*g*, and the upper wall 11*b* of the U-shaped portion 11*a* on the lower side. The labyrinth structure 11 of the present embodiment has the communication portions 11*h* formed in the center in the vehicle width direction of the U-shaped portions 11*a* formed in the louver member 10. In this manner, the two or more communication portions 11*h* of the labyrinth structure 11 are vertically arranged at a portion of the louver member 10 facing the air inlet 4*a* (see FIG. 2).

The length in the vehicle width direction of the communication portion 11*h* of the labyrinth structure 11 of the present embodiment is configured to be the same as that of the air inlet 4*a*. The upper wall 11*b* of the labyrinth structure 11 of the louver member 10 is formed substantially flat so as to downwardly reflect noise from the cooling fan 8 through the communication portion 11*h* (see an arrow C in FIG. 4).

Figure 5:
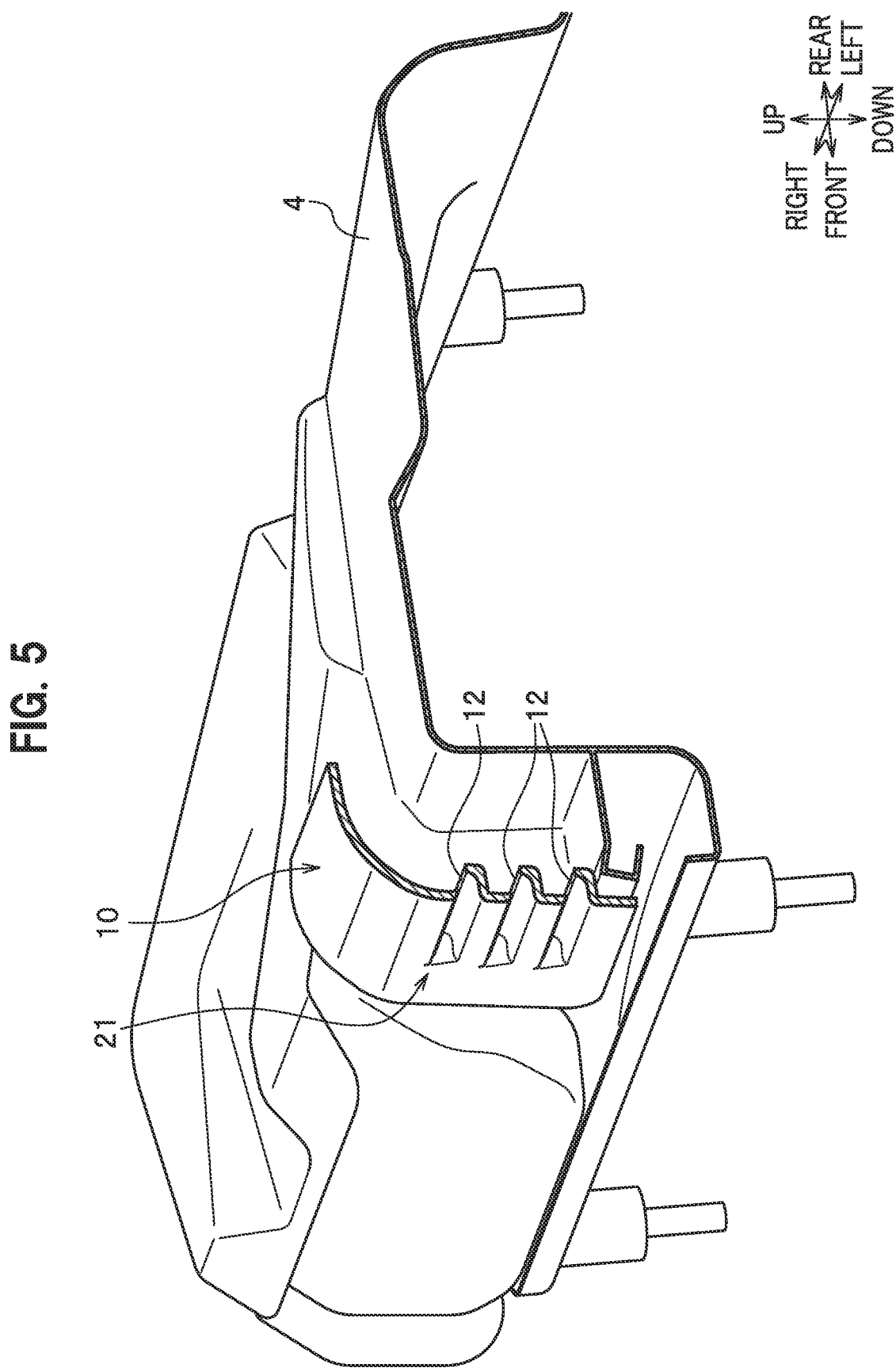
FIG. 5 is a partial cross-sectional perspective view of the louver structure according to the present embodiment, taken along a line V-V in FIG. 2.
Figure 6:
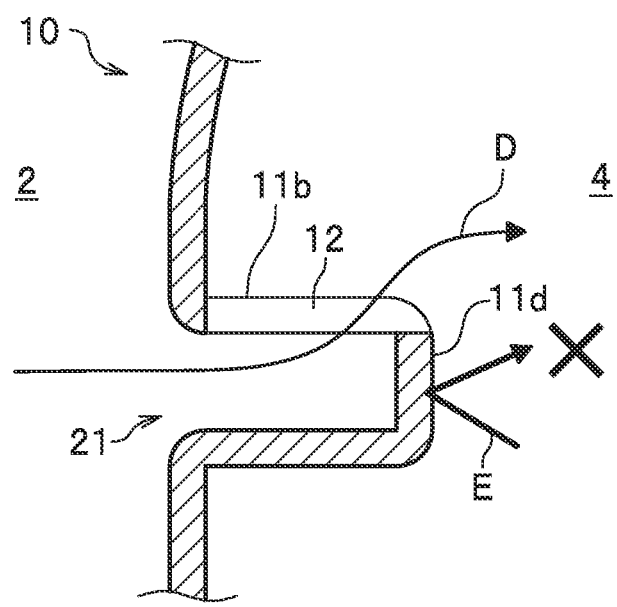
FIG. 6 is a vertical cross-sectional view of the louver structure according to the present embodiment, with a right or left portion in a vehicle width direction of the louver enlarged.

The louver member 10 has two or more openings 12 on right and left sides, each communicating vertically, outside in the vehicle width direction of the labyrinth structure 11, as shown in FIG. 5. The openings 12 of the present embodiment are arranged on right and left sides in the vehicle width direction of the labyrinth structure 11, as shown in FIG. 2. The opening 12 is formed in the upper wall 11*b* of the U-shaped portion 21 so as to communicate in the up-down direction, as shown in FIG. 6. The openings 12 are positioned so as not to overlap in the vehicle width direction with the air inlet 4*a*. Note that the louver member 10 has none of the upper wall 11*b* remaining at a portion thereof where the opening 12 is formed.

Figure 7:
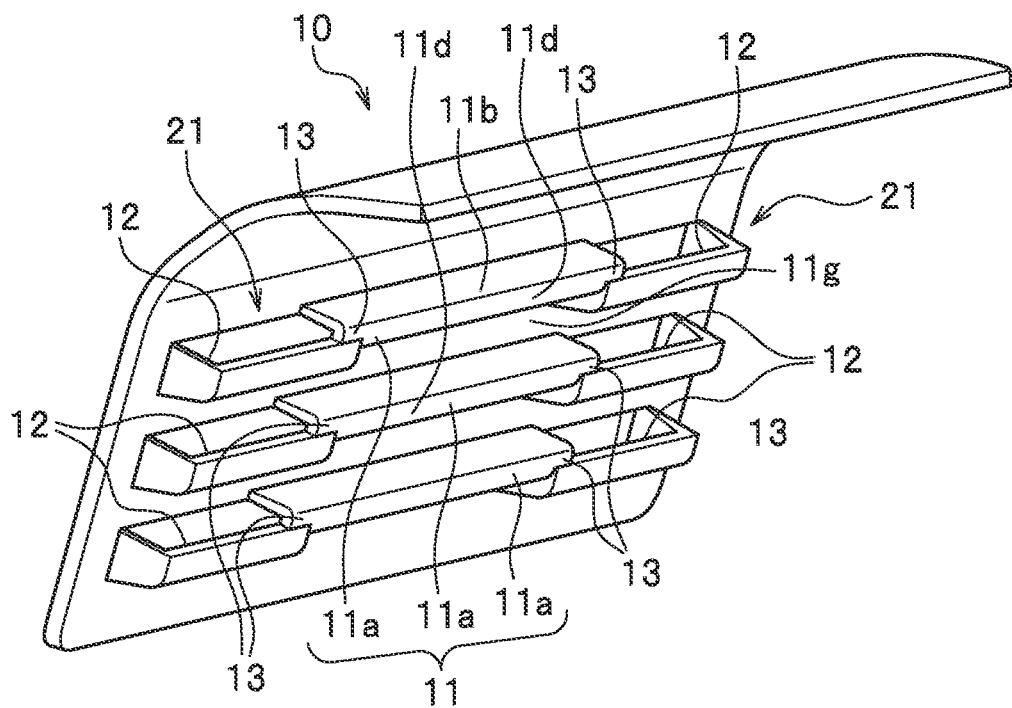
FIG. 7 is a perspective view of the louver structure according to the present embodiment, as viewed from obliquely above.
Figure 8:
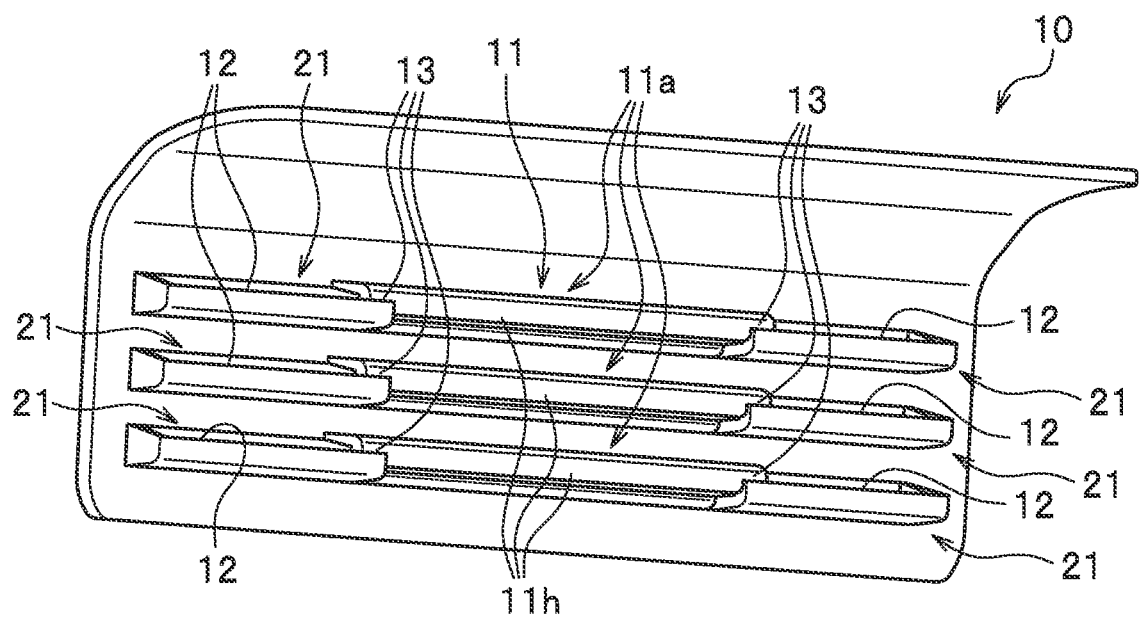
FIG. 8 is a perspective view of the louver structure according to the present embodiment, as viewed from obliquely below.

The louver member 10 of the present embodiment has the vertical walls 11*d* of the labyrinth structure 11 integrated with vertical walls at rims of the openings 12, via connection portions 13 on right and left sides, as shown in FIG. 7. Accordingly, the U-shaped portions 11*a* having the labyrinth structure 11 in the center in the vehicle width direction are respectively connected to the U-shaped portions 21 on right and left sides located outside in the vehicle width direction of the labyrinth structure 11 so as to be integrated therewith, and supported by both sides, as shown in FIG. 8.

In addition, the louver member 10 of the present embodiment has the vertical walls 11*d* of the labyrinth structure 11 integrally connected with the vertical walls at the rims of the openings 12 via the connection portions 13. This causes air flow paths 13*a* (see FIG. 3) to be defined in the connection portions 13 along the vehicle width direction so as to face the compartment 2, to communicate flow paths in the U-shaped portions 21 with flow paths in the U-shaped portions 11*a*. Accordingly, in the louver member 10 of the present embodiment, air in the compartment 2 introduced through the U-shaped portions 21 on the right and left sides located on the outer sides thereof is introduced via the air flow paths in the connection portions 13, facing the compartment 2, to the U-shaped portions 11*a* in the center in the vehicle width direction, and blown through the communication portions 11*h* toward the battery 4.

Next, a description is given of advantageous effects of the louver structure of the present embodiment. The louver structure of the present embodiment as configured above provides a louver structure to reduce noise propagated into the compartment 2. Specifically, the vehicle 1 includes the cooling fan 8 to cool the battery 4, the back wall 7 to separate a partition for the cooling fan 8 from the compartment 2, and the louver member 10 to cover the air inlet 4*a*, as shown in FIG. 1. The back wall 7 is formed with the air inlet 4*a* to communicate with the cooling fan 8. The back wall 7 has the louver member 10 attached thereto, to cover the air inlet 4*a*. The louver member 10 is provided with the labyrinth structure 11.

The vehicle 1 has the cooling fan 8 driven to cool the battery 4 so that air in the compartment 2 is introduced rearward through the air inlet 4 of the back wall 7 toward the battery case housing the battery 4. The louver member 10 is provided at the air inlet 4*a*, to form the labyrinth structure 11. In the labyrinth structure 11 in FIG. 4, air in the compartment 2 is introduced through an inflective path via the communication portion 11*h* toward the battery 4, as indicated by an arrow A. This causes the air introduced through the labyrinth structure 11 to draw heat from around the battery body housed in the battery case and then to be discharged. Thus, the vehicle 1 having the louver member 10 provided at the air inlet 4*a* achieves a desired cooling effect of the battery 4. In addition, a portion of the louver member 10 having the labyrinth structure 11 overlaps in the vehicle width direction with the air inlet 4*a*, as shown in FIG. 2.

Noise generated by driving the cooling fan 8 is inhibited by the inflective labyrinth structure 11 formed in the louver member 10 from propagating straight. This reduces noise propagated into the compartment 2. Noise is inhibited by the lower wall 11*c* of the labyrinth structure 11 as indicated by a broken line B in FIG. 4. Additionally, noise reflected by the upper wall 11*b* is directed to the floor carpet 5 provided over the floor panel, and then absorbed by the floor carpet 5. Accordingly, noise by driving the cooling fan 8, to be propagated to the compartment 2, is reduced.

Further, the back wall 7 includes the recessed portion 5*c* provided in the region inclusive of the air inlet 4*a* so as to have a larger width than the air inlet 4*a*. The louver member 10 is arranged to cover the recessed portion 5*c*, and the labyrinth structure 11 is provided at a portion of the louver member 10 facing the air inlet 4*a*. This prevents intake resistance from increasing, to improve intake efficiency, and the labyrinth structure 11 of the louver member 10 reduces noise propagated into the compartment 2.

As shown in FIG. 3, the louver member 10 has the two or more U-shaped portions 11a, each extending in the vehicle width direction and having a substantially U-shape in cross section so as to open to the compartment 2, aligned in the up-down direction. As shown in FIG. 4, the louver member 10 has the labyrinth structure 11 provided in the center in the vehicle width direction of the U-shaped portion 11a. As shown in FIG. 5, the louver member 10 also has the openings 12 of FIG. 6 provided in the upper walls 11b of the U-shaped portions 11a and on the outsides in the vehicle width direction of the labyrinth structure 11, to communicate in the up-down direction.

This allows the air from the compartment 2 to be introduced through the communication portions 11h in the labyrinth structure 11 toward the battery 4, as indicated by a solid line D. Besides, the openings 12 formed in the upper walls 11b are located on outer sides in the vehicle width direction of the labyrinth structure 11, and thus do not overlap in the vehicle width direction with the air inlet 4a (see FIG. 2). Such an arrangement thus reduces noise E propagated into the compartment 2 through the openings 12 to communicate in the up-down direction.

In addition, the present embodiment has the vertical wall 11d of the labyrinth structure 11 connected to the vertical walls at the rims of the openings 12, which are arranged on the right and left sides of the vertical wall 11d, via the connection portions 13 so as to be integrated, as shown in FIG. 7. This allows the vertical walls at the rims of the openings 12 to be aggregately supported from both sides in the right-left direction, to achieve desired support rigidity, even with the U-shaped portions 11a having the openings 12.

The louver member 10 of the present embodiment allows air from the compartment 2 introduced through the openings 12 of the U-shaped portions 21, located on the right and left sides laterally in the vehicle width direction, to be flowed from the right and left sides in the vehicle width direction and then blown toward the air inlet 4a for the battery 4. In this manner, the air from the compartment 2 is flowed through the openings 12 on the right and left sides formed in the U-shaped portions 21. As a result, air flowed through the openings 12 on the right and left sides compensates for air resistance increased by the labyrinth structure 11 so as to be eased.

The louver member 10 has the two or more U-shaped portions 11a, each extending in the vehicle width direction and having a substantially U-shape in cross section so as to open to the compartment 2, aligned in the up-down direction, as shown in FIG. 3. The U-shaped portion 11a has the upper wall 11b, the lower wall 11c, and the vertical wall 11d, as shown in FIG. 4. In addition, the connection wall 11g is provided between the adjacent U-shaped portions 11a so as to connect the inside edge 11e of the lower wall 11c of the U-shaped portion 11a on the upper side with the inside edge 11f of the upper wall 11b of the U-shaped portion 11a on the lower side. The lower wall 11c is formed, in a portion thereof closer to the vertical wall 11d, with the communication portion 11h to communicate in the up-down direction. The labyrinth structure 11 is configured to have the upper wall 11b, the vertical wall 11d, the lower wall 11c formed with the communication portion 11h, the connection wall 11g, and the upper wall 11b of the U-shaped portion 11a on the lower side.

The louver structure of the present embodiment as configured above has the two or more U-shaped portions 11a to form the labyrinth structure 11 in the louver member 10. As a result, the louver structure is provided that reduces noise propagated to the compartment, while easily introducing air to be used for cooling the battery 4.

The present invention is not limited to the embodiment as described above, and various modifications may be made. The embodiment as described above is used for the purpose of illustrating the present invention, and the invention is not necessarily limited to one having all the components as described above. In addition, a part of one embodiment may be replaced with that of another embodiment, or a part of one embodiment may be added with that of another embodiment. Further, a part of one embodiment may be deleted, or added/replaced with that of another embodiment. A possible modification of the present embodiment is described below, as an example.

The battery 4 is used in the present embodiment as a cooled object, but the invention is not limited thereto. Electronic equipment may be a cooled object, for example. That is, anything can be a cooled object, as far as it can be cooled by the cooling fan 8. In addition, the louver member 10 of the present embodiment has the three U-shaped portions 11a, each extending in the vehicle width direction and having a substantially U-shape in cross section so as to open to the compartment 2, aligned in the up-down direction. However, the present invention is not limited thereto. The louver member 10 may have the two U-shaped portions or the four or more U-shaped portions aligned in the up-down direction, and there is no specific limitation on the number of the U-shaped portions aligned in the up-down direction, the geometry of the length in the vehicle width direction and the like, and material of the louver member 10.

What is claimed is:

1. A louver structure comprising:
   a cooling fan configured to cool a cooled object;
   a back wall configured to separate the cooling fan from a compartment of a vehicle and having an air inlet to communicate with the cooling fan for the cooled object; and
   a louver member attached to the back wall and covering the air inlet,
   wherein
   the louver member is provided with a labyrinth structure,
   the louver member has two or more U-shaped portions, each extending in a vehicle width direction and having a substantially U-shape in cross section so as to open to the compartment, aligned in the up-down direction,
   the U-shaped portion has an upper wall, a lower wall, and a vertical wall,
   a connection wall is provided between the adjacent U-shaped portions so as to connect an inside edge of the lower wall of the U-shaped portion on an upper side with an inside edge of the upper wall of the U-shaped portion on a lower side,
   the lower wall is formed, in a portion thereof closer to the vertical wall, with a communication portion to communicate in an up-down direction, and
   the labyrinth structure is configured to have the upper wall, the vertical wall, the lower wall formed with the communication portion, the connection wall, and the upper wall of the U-shaped portion on the lower side.

2. The louver structure as claimed in claim 1, wherein
   the back wall includes a recessed portion provided in a region thereof inclusive of the air inlet so as to have a larger width than the air inlet,
   the louver member is arranged to cover the recessed portion, and
   the labyrinth structure is provided at a portion of the louver member facing the air inlet.

3. The louver structure as claimed in claim 2, wherein
the louver member has the labyrinth structure provided in the center in the vehicle width direction of the U-shaped portion, and
the louver member has openings each provided in the upper wall and on an outside in the vehicle width direction of the labyrinth structure, to communicate in the up-down direction.

\* \* \* \* \*